Patented Mar. 9, 1948

2,437,582

UNITED STATES PATENT OFFICE 2,437,582

PROCESS FOR THE PREPARATION OF DI-PENTAERYTHRITOL HEXANITRATE

Joseph A. Wyler, Allentown, Pa., assignor to Trojan Powder Company, Allentown, Pa.

No Drawing. Application October 30, 1945, Serial No. 625,697

1 Claim. (Cl. 260—467)

This invention relates to a process for the preparation of dipentaerythritol hexanitrate.

It is well known that dipentaerythritol can be nitrated to the hexanitrate. However, in all known cases, the dipentaerythritol hexanitrate as it is precipitated out of its nitration bath is in the liquid or pasty condition—a physical condition which is very objectionable for the further purification of this explosive.

Dipentaerythritol hexanitrate is normally a solid of melting point about 76° C. and would be expected to separate in a crystalline or solid condition from its nitration baths if the temperature of these baths is substantially below 76° C. However, as indicated above, so far as I am aware, all known nitration processes produce a liquid dipentaerythritol hexanitrate as a direct result of the nitration or of the nitration followed by drowning, even though the nitration temperatures or drowning temperatures are as low as —10° C. or even lower.

The separation of the dipentaerythritol hexanitrate from an acid medium, in the form of a liquid or paste has at least two serious objections. First, this type of dipentaerythritol hexanitrate is very difficult if not impossible to properly stabilize without resolution in a solvent such as acetone; and second, it is inherently dangerous due to the dipentaerythritol hexanitrate sticking to the sides and crevices of the nitrating and drowning vessels and then slowly solidifying to hard cakes, which are unstable and sensitive to friction.

It is an object of this invention to prepare a finely crystalline, solid dipentaerythritol hexanitrate directly in the nitration operation itself. Another object is to provide a short, economical process for the preparation of dipentaerythritol hexanitrate of excellent stability. A further object is to provide a much safer process for the preparation of this explosive. Other and further objects will become apparent upon a perusal of this specification and claims.

I have discovered that dipentaerythritol can be nitrated to form the hexanitrate without undergoing any significant change in physical condition. The dipentaerythritol does not form a colloidal or a pasty mass as it comes in contact with my nitrating mixtures and it does not dissolve in my acid mixture to any appreciable degree. This results in a nitrated product which can be filtered off directly after the nitration itself or upon dilution of this nitrated charge with water, and is particularly adapted to further purification and stabilization.

In all heretofore known processes for the preparation of dipentaerythritol hexanitrate it has been necessary to dilute the final nitration mixture with water in order to separate the main portion of dipentaerythritol hexanitrate from its spent acid, and this dipentaerythritol hexanitrate invariably separated as a liquid or pasty mass which cannot be filtered, but must be taken up in a solvent and reprecipitated from this solvent to obtain a crystalline, stable product.

I have also discovered that if dipentaerythritol is nitrated in a mixture comprising $H_2SO_4$, $HNO_3$ and water of certain critical proportions and at certain temperatures the dipentaerythritol hexanitrate resulting will possess the advantages mentioned above and provide the basis of my short process for the preparation of pure and stable dipentaerythritol hexanitrate.

The limits in composition of my nitrating acid are:

$H_2SO_4$—Not less than about 15% and not more than about 80%
$HNO_3$—Not less than about 15% and not more than about 80%
$H_2O$—Not less than about 5% and not more than about 23%.

and the maximum temperature of nitration is about 25° C.

In order to more clearly point out my invention, the following examples, in which all parts are by weight, are given.

In these examples as in the limits in composition of nitrating acid as stated above, the percentages are parts by weight for 100 parts of the nitrating acid. In the said limits for example the water present is within the range of approximately 5–23 parts which means that the total of sulfuric and nitric acid is within the approximate range 95 to 77 parts, whereas in Examples 1, 2 and 3 the total of the acids varies from 84.85 parts to 95 for 100 of the mixed acid.

Example #1

15 parts of a mixed acid consisting of

| | Per cent |
|---|---|
| $H_2SO_4$ | 55.62 |
| $HNO_3$ | 33.96 |
| $H_2O$ | 10.42 |
| | 100.00 | were placed in a nitrating vessel provided with a cooling jacket and mechanical stirring. 1 part of finely powdered dipentaerythritol was slowly fed to this mixed acid, with stirring and cooling of the mixture to about 10° C.

The dipentaerythritol was quickly reacted upon by the mixed acid and a fine, crystalline, granular dipentaerythritol hexanitrate formed and remained in suspension in the spent acid.

The nitration mixture was stirred at about 10° C. for a half hour after the addition of the dipentaerythritol, then drowned in about four times its weight of cold water, the mixture stirred a few minutes and filtered. The residue upon the filter was washed with water, transferred to about 5 parts of a 1% solution of $NH_3$, stirred for 4 hours, filtered, and the residue on the filter washed with water and dried at about 50° C. The yield of pure dipentaerythritol hexanitrate obtained was 2.06 parts for each part of dipentaerythritol. The final, dry product had excellent stability toward heat.

Instead of drowning the nitrated charge, as was done in the example, the nitration mixture may be filtered directly, but in this case the filter used must be capable of withstanding the corrosive action of the strong spent acids. In either case the dipentaerythritol hexanitrate will be in the form of crystals free from sticky material and will be capable of stabilization without requiring dissolving in a solvent before stabilization.

Using, for contrast with my improved method, a mixed acid of the following composition:

| | Per cent |
|---|---|
| $H_2SO_4$ | 39.66 |
| $HNO_3$ | 34.89 |
| $H_2O$ | 25.45 |
| | 100.00 | and proceeding otherwise as under Example #1 produced only an oily liquid as the nitrated product. This liquid ocntained 12.16% N, by nitrometer, as against 16.03% N required for pure dipentaerythritol hexanitrate.

Example #2

Using a mixed acid of the following composition:

| | Per cent |
|---|---|
| $H_2SO_4$ | 65.16 |
| $HNO_3$ | 19.69 |
| $H_2O$ | 15.15 |
| | 100.00 | a ratio of dipentaerythritol to mixed acid of 1 to 20, and proceeding as under Example #1 gave a good yield of a pure, stable dipentaerythritol hexanitrate.

Using for contrast with my method a mixed acid of the following composition:

| | Per cent |
|---|---|
| $H_2SO_4$ | 10.18 |
| $HNO_3$ | 64.39 |
| $H_2O$ | 25.43 |
| | 100.00 | and proceeding otherwise as under Example #1 gave no dipentaerythritol hexanitrate. The dipentaerythritol dissolved in the mixture, generated heat, and the mixture became uncontrollable. It gave off red fumes and decomposed, instead of nitrating the dipentaerythritol.

Example #3

Using a mixed acid of the following composition:

| | Per cent |
|---|---|
| $H_2SO_4$ | 74.69 |
| $HNO_3$ | 20.31 |
| $H_2O$ | 5.00 |
| | 100.00 | and proceeding as under Example #3 gave a product of excellent stability with good yield.

In the examples given above low ratios of dipentaerythritol to mixed acid were used for the purpose of more definitely illustrating the nature of the invention. I have used higher and lower ratios with equal success, depending upon the composition of the mixed acid used. If mixed acids relatively low in water and relatively high in nitric acid are used, a higher ratio of dipentaerythritol to mixed acid may be used than when the water content of the starting mixed acid is already high and the nitric acid content low. In general I prefer a ratio of 1 part of dipentaerythritol to 10 parts of mixed acid.

Also, the temperature of nitration may be varied over a considerable range provided the temperature is kept below about 25° C., and not so low as to increase the viscosity of the nitrating mixture to the point where stirring becomes difficult. Temperatures as low as minus 10° C. have been very successful. In general, I prefer a temperature of nitration of between 5° C. to 15° C.

The rate of feed of the dipentaerythritol to the mixed acid should not be too fast for the ability of the particular mixed acid being used, to wet and disperse the individual particles of dipentaerythritol being nitrated. In this connection it should be borne in mind that the dipentaerythritol particles do not dissolve in the mixed acid. Those which are large enough to be seen clearly with the naked eye do not seem to change in physical appearance to any significant extent. They simply nitrate and remain as discrete, firm particles. A microscopic examination of the final nitrated product made by my process shows that the dipentaerythritol hexanitrate is present as separate, firm, discrete particles possessing no stickiness and being definitely crystalline.

The removal of acids, adhering to the dipentaerythritol hexanitrate which is suspended in the spent acid resulting from the nitration, may be carried out by first filtering, centrifuging or settling the dipentaerythritol hexanitrate, then washing the latter with cold water, followed by stirring in a dilute, aqueous solution of an alkali such as ammonia, NaOH, $Na_2CO_3$, $Na_2HPO_4$, $NaHCO_3$, etc., washing the dipentaerythritol hexanitrate with water and drying.

My invention, therefore, comprehends a short process for the preparation of dipentaerythritol hexanitrate which produces, directly in the nitration itself, a particularly advantageous form of dipentaerythritol hexanitrate which in turn lends itself to a much simpler and cheaper process for the purification and stabilization of this explosive. It will be apparent that many modifications may be made in my process without departing from the essence of my invention and I do not limit myself in any way except as indicated in the appended claim.

I claim:

The method of making dipentaerythritol hexanitrate which comprises nitrating dipentaerythritol in mixed acid at a temperature not above 25° C., the mixed acid containing 5 to 23 parts of water and a total of nitric acid and sulfuric acid within the approximate range 77 to 95 parts for 100 parts of the mixed acid and containing not less than about 15 parts of sulfuric acid and not less than about 15 parts of nitric acid for 100 parts of the mixed acid, the nitration as described causing separation of dipentaerythritol hexanitrate crystals from the nitrating bath as the hexanitrate is produced.

JOSEPH A. WYLER.

REFERENCES CITED

The following references are of record in the file of this patent:

UNITED STATES PATENTS

| Number | Name | Date |
| --- | --- | --- |
| 1,371,215 | Barab | Mar. 15, 1921 |

OTHER REFERENCES

Friederich et al., "Berichte deutsche Chem. Gesell.," vol. 63 (1930), pages 2681, 2683.